United States Patent
Adermann et al.

(10) Patent No.: US 7,690,005 B2
(45) Date of Patent: *Mar. 30, 2010

(54) BLUETOOTH TDI AND WINSOCK INTERFACE

(75) Inventors: Stanley W. Adermann, Sammamish, WA (US); Siamak Poursabahian, Redmond, WA (US); Louis J. Giliberto, Duvall, WA (US); Doron J. Holan, Seattle, WA (US); Husni Roukbi, Seattle, WA (US); Kenneth D. Ray, Redmond, WA (US); Joseph M. Joy, Redmond, WA (US); William Michael Zintel, Kenmore, WA (US); Mark D. Bertoglio, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1199 days.

This patent is subject to a terminal disclaimer.

(21) Appl. No.: 11/251,978

(22) Filed: Oct. 17, 2005

(65) Prior Publication Data

US 2006/0037028 A1    Feb. 16, 2006

Related U.S. Application Data

(63) Continuation of application No. 09/707,120, filed on Nov. 6, 2000, now Pat. No. 6,961,942.

(51) Int. Cl.
  *G06F 9/54* (2006.01)
  *G06F 9/46* (2006.01)
(52) U.S. Cl. .................... 719/321; 719/328
(58) Field of Classification Search .............. 719/321, 719/328, 313
See application file for complete search history.

(56) References Cited

U.S. PATENT DOCUMENTS

| 5,566,331 | A  | 10/1996 | Irwin, Jr. et al. |
| 5,727,212 | A  | 3/1998 | Dinallo |
| 5,815,682 | A  | 9/1998 | Williams et al. |
| 5,918,158 | A  | 6/1999 | LaPorta et al. |
| 5,949,776 | A  | 9/1999 | Mahany et al. |
| 6,041,075 | A  | 3/2000 | Caushik |
| 6,202,147 | B1 | 3/2001 | Slaughter et al. |
| 6,219,707 | B1 | 4/2001 | Gooderum et al. |
| 6,226,719 | B1 | 5/2001 | Minow |

(Continued)

OTHER PUBLICATIONS

Brent Miller, "Mapping Salutation Architecture APIs to Bluetooth Service Discovery Layer, Version 1.0," Jul. 1, 1999, pp. 1-26.*

(Continued)

*Primary Examiner*—Li B Zhen
(74) *Attorney, Agent, or Firm*—Collins & Collins Incorporated; L. Alan Collins

(57) ABSTRACT

A method, apparatus, and computer program product provide applications and application developers with generic access from user mode to the L2CAP layer of Bluetooth by exposing the L2CAP layer to user mode via a socket interface. In particular, a kernel mode primary component and user mode helper component cooperate to expose a Winsock interface to user mode components, and to manage various Bluetooth-specific functions and operations, allowing a user mode user application to access Bluetooth functionality without providing Bluetooth-specific commands or actions, and without being required to use RFCOMM.

20 Claims, 7 Drawing Sheets

U.S. PATENT DOCUMENTS

| | | | |
|---|---|---|---|
| 6,470,397 B1 | 10/2002 | Shah et al. | |
| 6,480,711 B1 | 11/2002 | Guedalia | |
| 6,600,726 B1 | 7/2003 | Nevo et al. | |
| 6,603,744 B2 | 8/2003 | Mizutani et al. | |
| 2002/0012329 A1 | 1/2002 | Atkinson et al. | |

OTHER PUBLICATIONS

"Windows Sockets 2 Application Programming Interface, Revision 2.2.2", Aug. 7, 1997, pp. 1-283.*

Brent Miller, "Mapping Salutation Architecture APIs to Bluetooth Service Discovery Layer, Version 1.0," Jul. 1, 1999, pp. 1-26.

"Windows Sockets 2 Application Programming Interface, Revision 2.2.2", Aug. 7, 1997, pp. 1-283.

"Specification of the Bluetooth System—Core", v.1.0B, Dec. 1,1999 (1082 pgs.).

"Specification of the Bluetooth System. Profiles", v.1.0B, Dec. 1, 1999 (440 pgs.).

Bhagwat: "Networking over Bluetooth: Overview and issues", IAB Wireless Workshop, Feb. 29 Mar. 2, 2000 (48 pgs.).

Cant: "Windows Driver Model (WDM) Device Drivers", PHD Computer Consultants Ltd, Jan. 1999 (13 pgs.).

Foley: "Bluetooth User Experience in Windows"; Aug. 2004; (27 pgs.).

Kardach: "Bluetooth Architecture Overview"; Mar. 1999 IEEE 802.11-99/53; (33 pgs.).

"Plug and Play for Windows NT 5.0", Microsoft Windows NT Server. Copyright 1997 (14 pgs.) "For this reference with a year of publication listed but not a month, the year of publication is sufficiently earlier than the effective U.S. filing date and any foreign priority date so that the particular month of publication is not in issue (see MPEP 609.04(a))."

"Remote NDIS Specification", Rev 0.80, Oct. 27, 1999, Microsoft Corporation (50 pgs.).

Moore: "Windows Wireless Architecture"; Microsoft Exchange Conference Oct. 1999; (71 pgs.).

Rajagopal: "RFCOMM on the PC", Intel Corporation Dec. 7, 1999 (42 pgs.

Ray et at.: Bluetooth Stack In Windows; WinHEC Apr. 2000; (30 pgs.).

Sorensen: "RFCOMM", Dec. 7, 1999 (42 pgs.).

Tomlinson: "Plug and Play", Windows Developer's Journal Dec. 1995 (6 pgs.).

Udell: "Windows NT Up Close: An in-depth look at Microsoft's next-generation operating system", BYTE. Oct. 1992; p. 167: vol. 17. No. 10 (16 pgs.).

Riku Mettaila et al., "Bluetooth Protocol Architecture" (White Paper), V1.0, Nokia Mobile Phones, Sep. 29, 1999.

Martin Hall, Mark Towfig, Geoff Arnold, David Treadwell, and Henry Sanders, "Windows Sockets", Jan. 1993, Version 1.1, pp. 4-11.

IEEE Standard, 802.11, "Part 11: Wireless LAN Medium Access Control (MAC) and physical Layer (PHY) Specifications", 1st Ed. 1999, and Supplements 802.11a-1999 and 802.11b-1999. "For this reference with a year of publication listed but not a month, the year of publication is sufficiently earlier than the effective U.S. filing date and any foreign priority date so that the particular month of publication is not in issue (see MPEP 609.04(a))."

Bob O'Hara and Al Petrick, "IEEE 802.11 Handbook A Designer's Companion", Dec. 1999.

Pat Megowan et al., "IrDA Object Exchange Protocol", V1.2, Counterpoint Systems Foundry, Inc. Microsoft Corporation, Mar. 18, 1999.

"Universal Plug and Play Device Architecture", V1.0, Microsoft Corporation, Jun. 8, 2000.

Golden G. Richard III, "Service Advertisement and Discovery: Enabling Universal Device Cooperation", http://computer.org/internet/, Sep.-Oct. 2000.

ETSI TS 101 369 v7.1.0(Nov. 1999), "Digital Cellular Telecommunications System (Phase 2 +): Terminal Equipment to Mobile Station (TE-MS) Multiplexer Protocol", Global System for Mobile Communications (GSM) 07.10 v7.1.0 Release 1998. "For this reference with a year of publication listed but not a month, the year of publication is sufficiently earlier than the effective U.S. filing date and any foreign priority date so that the particular month of publication is not in issue (see MPEP 609.04(a))."

Kris Fleming et. al, "Architectural Overview of Intel's Bluetooth software Stack," May 2000, p. 1-10.

* cited by examiner

BLUETOOTH TDI AND WINSOCK INTERFACE

RELATED APPLICATIONS

This is a continuation of U.S. application Ser. No. 09/707,120, filed Nov. 6, 2000 which is herby incorporated herein by reference.

TECHNICAL FIELD

This invention relates generally to Bluetooth wireless interface technology and, more particularly, relates to the interface between user mode components and kernel mode components operating in accordance with the Bluetooth specification.

BACKGROUND OF THE INVENTION

Generally, computers and other electronic devices are interconnected via physical cables or wires. These communication paths allow for the exchange of data or control information between such devices. However, it is increasingly recognized that certain advantages arise from the elimination of cables and wires to interconnect devices. Such advantages include ease of configuration and reconfiguration, due to the elimination of the need to physically add, remove, or displace a physical medium. Furthermore, space that would ordinarily be used for device interconnection media may be given to other uses. Significantly, device mobility is increased through the use of wireless connections.

One method for providing wireless connections between devices employs a light wave in the infrared region of the electromagnetic spectrum to link devices. The IrDA (Infrared Data Association) protocol defines one such connection mechanism. Unfortunately, such a mechanism must usually operate in a line of sight manner; any opaque obstruction between transmitter and receiver will prevent proper operation. Additionally, IR transmitters are typically not omnidirectional when incorporated into a communicating device, so that for proper operation, the transmitter must be aimed generally in the direction of the receiver, within some nominal deviation such as thirty degrees. Finally, IR transmitters are typically fairly low power devices, and accordingly the range of IR links is usually limited to approximately one meter.

Radio frequency linking solves many of the problems inherent in infrared linking. One protocol that defines communication between wireless devices through a radio frequency link is the Bluetooth specification. Bluetooth devices do not require a line of sight with one another to operate, and their range can be significantly greater than that of IR links. However, there are several obstacles to widespread implementation of the Bluetooth specification. Bluetooth compliant devices are generally presented to user-mode applications as serial interfaces via RFCOMM. In addition to the fact that the number of such interfaces is limited to 30 emulated RS-232 ports (the L2CAP layer is capable of supporting a much greater number of connections), there may be situations it which the serial presentation itself is not desirable or even acceptable. For example, an application developer may wish to develop an application that uses a customized or proprietary protocol to communicate with another device.

Application developers therefore need a mechanism that provides them with generic access to the transport layer of Bluetooth, i.e. the layer implementing L2CAP, without being required to interface with RFCOMM, and without being required to construct custom kernel-mode components for each application to provide such access.

SUMMARY OF THE INVENTION

Accordingly, the present invention provides a method, apparatus, and computer program product that furnish applications and application developers with generic access from user mode to the L2CAP layer of Bluetooth, by exposing the layer to user mode via a socket interface.

A kernel mode primary component and user mode helper component cooperate to expose a Winsock interface to user mode components. These elements manage various Bluetooth-specific functions and operations, allowing a user mode user application to access Bluetooth functionality without providing Bluetooth-specific commands or actions. This in turn simplifies application development and deployment. For example, an application developer may distribute an application configured to exploit Winsock communications facilities, and with only minimal changes the application could access radio frequency communications links via an embodiment of the invention.

In a particular aspect of the invention, the kernel mode primary component operates to translate TDI data protocol communications from higher layers into BRB or similar data protocol communications, and further acts to facilitate connection by independently initiating and accepting connection setup communications once requested to create a connection. The user mode helper component may maintain a name-to-SDP mapping facility for use by Winsock, and may provides additional services relating to aspects of Bluetooth connectivity and communication.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
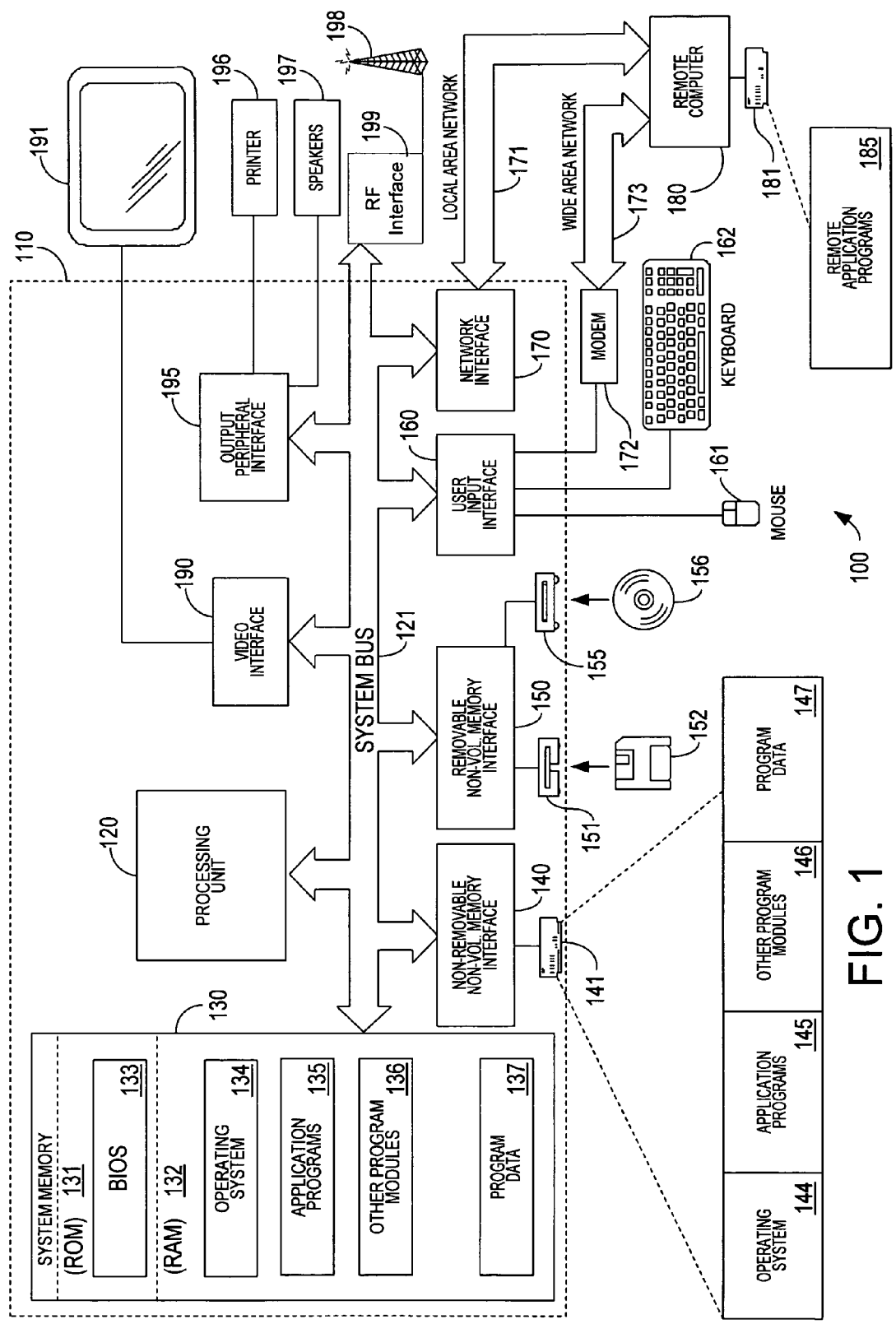
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including computing devices such as hand-held or laptop devices, multi-processor systems, microprocessor based or programmable consumer electronics, network PCs, minicomputers, mainframe computers, server computers, set top boxes, network PCs, distributed computing environments that include any of the above systems or devices, and the like. In distributed computing environments, tasks are performed by remote processing devices that are linked through a communications network. Further, in a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190. When used in conjunction with an RF connection 198, the personal computer 110 includes an RF interface 199.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

The operation of the Bluetooth radio frequency communications system is described in detail in the "Specification of the Bluetooth System" Version 1.0B (Dec. 1, 1999), incorporated herein by reference in its entirety. The Logical Link Control and Adaptation Layer Protocol (L2CAP) of Bluetooth is layered over a baseband protocol and provides connection-oriented and connectionless data services, segmentation and reassembly operation, group abstractions, and quality-of-service operations. For example, compared to other connection media, the data packets defined by the Bluetooth Baseband Protocol are quite limited in size. Thus, large L2CAP packets must be segmented into smaller Baseband packets prior to transmission.

According to the Bluetooth specification, the L2CAP layer interfaces with other communications protocols such as the Bluetooth SDP, RFCOMM, and Telephony Control. The RFCOMM protocol provides emulation of serial ports over the L2CAP protocol, based on the TS 07.10 standard, supporting up to 30 emulated RS-232 (COM) port connections from each of two peer Bluetooth devices. Typically, user level applications use RFCOMM to access L2CAP functionality.

According to an embodiment of the invention, a kernel-level protocol module and user-level helper module cooperate to expose an interface to access the L2CAP layer from user mode without requiring the services of RFCOMM. In this embodiment, such functionality in exposed to user mode via a Winsock interface.

Winsock (Microsoft brand "WINDOWS" Sockets) is a programming interface (API) that traditionally allows a "WINDOWS" application to access the TCP/IP protocol.

Figure 2:
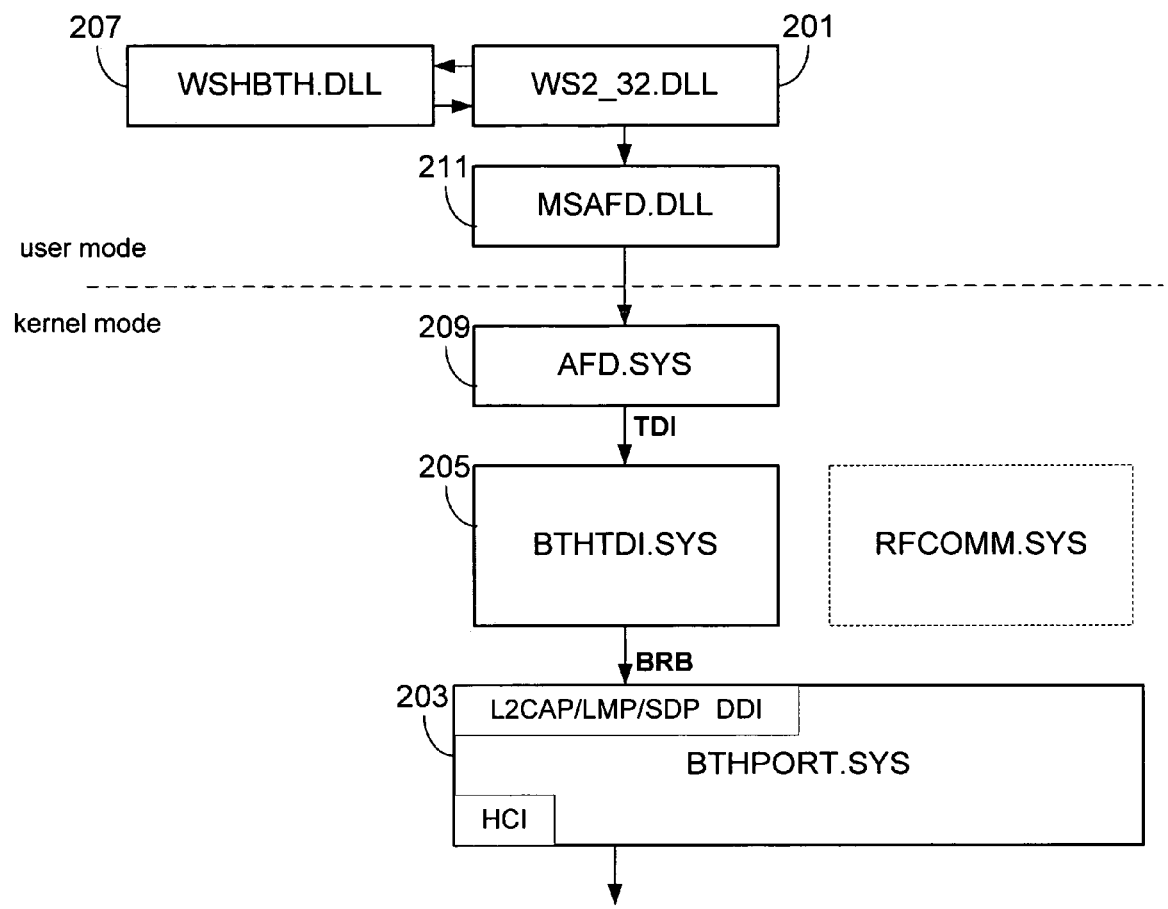
FIG. 2 is a simplified illustration of a layered architecture in keeping with an embodiment of the invention.

Winsock routines are ordinarily implemented as a dynamic link library (dll). The Winsock hierarchy generally consists of a Winsock-compliant application interfaced to a Winsock-compliant TCP/IP stack via the Winsock API. The stack in turn interfaces to the appropriate network driver. The manner in which Winsock is incorporated in this embodiment of the invention is illustrated in FIG. 2. This figure illustrates various interrelated system components in the user level and kernel level of a system according to an embodiment of the invention. In overview, the Winsock DLL 201 (WS2_32.DLL) accesses the L2CAP layer 203 (BTHPORT.SYS) via a translation layer BTHTDI.SYS 205. A Winsock helper 207 (WSHBTH.DLL) provides addressing and other Bluetooth-specific functionality for use by the Winsock DLL 201. The service provider AFD.SYS 209 is the standard Winsock2 service provider for transports such as TCPIP and IrDA, and interfaces to user mode via MSAFD.DLL 211. In addition to implementing the L2CAP protocol, BTHPORT.SYS 203 also may implement the Host Controller Interface (HCI), Service Discovery Protocol (SDP), and Link Manager Protocol (LMP) as these are defined in the Bluetooth specification.

Figure 3:
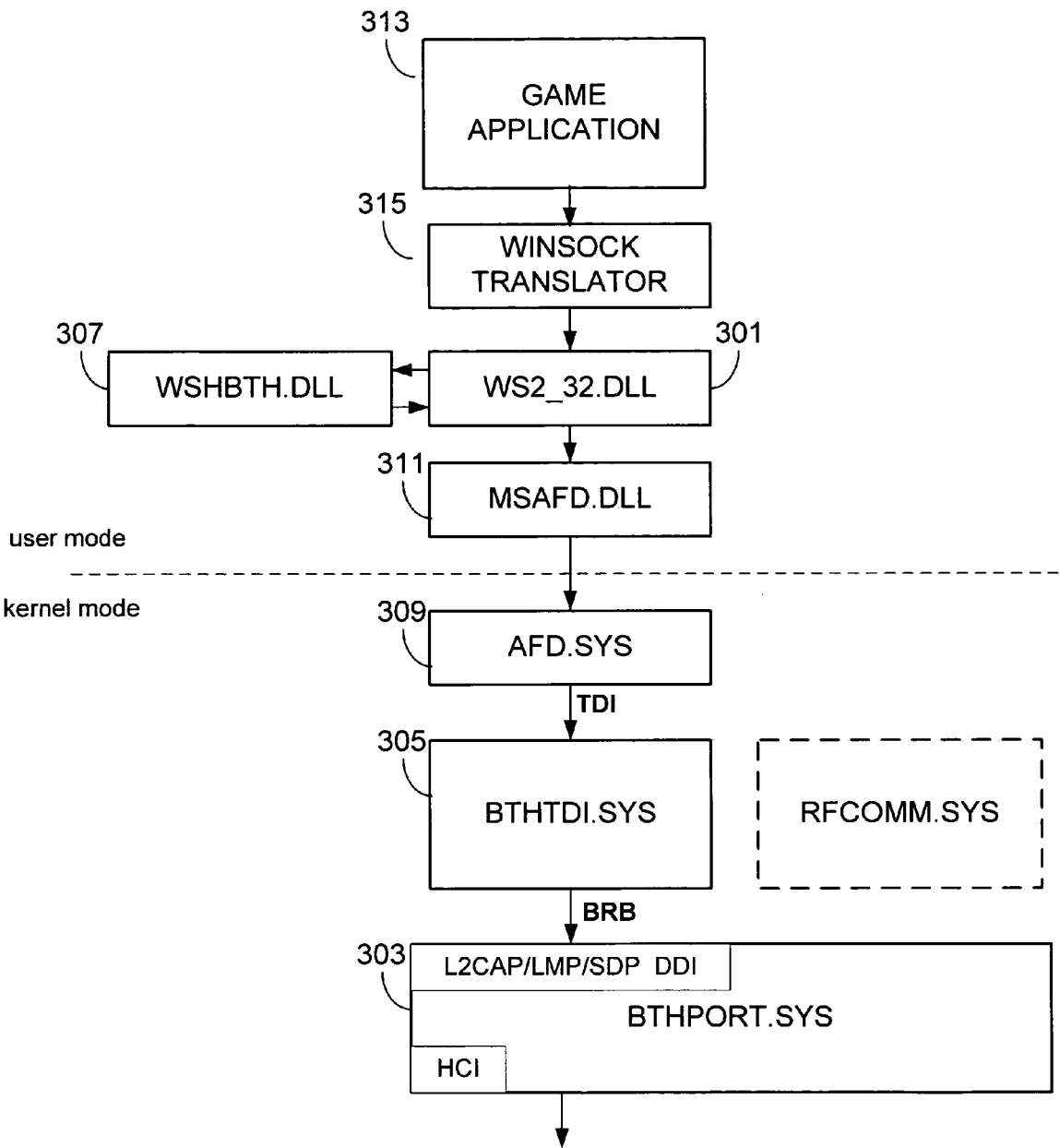
FIG. 3 is a simplified illustration of a layered architecture in keeping with an embodiment of the invention as used with a user mode application.

FIG. 3 schematically illustrates one exemplary usage scenario of an embodiment of the invention. A user application 313, illustrated as a gaming application, resides in user mode. A simple Winsock translator 315 serves to interface the game to network functionality via Winsock. The translator 315 may be a separate component as illustrated or may instead be incorporated in the application itself, in this instance the game application 313. The Winsock module 301, referred to above as WS_32.dll, directs information to and from kernel mode via MSAFD.DLL 311 followed by AFD.SYS 309, which interfaces to the Transport driver (kernel mode translation layer) BTHTDI.SYS 305 via a TDI interface. In turn, BTHTDI.SYS 305 passes information to, and receives information from, the L2CAP layer (protocol module) BTHPORT.SYS 303 by way of Bluetooth Request Blocks (BRBs).

Thus, in overview, the data flow during a session initiates or terminates at the application 313, having traversed all of the Winsock DLL 301, the AFD user and kernel mode components 311 and 309, the Transport driver BTHTDI.SYS 305, and the L2CAP layer BTHPORT.SYS 303. Prior to connection, BTHTDI.SYS 305 preferably performs an SDP query, the results of which may be used to establish a name-to-SDP mapping in the Winsock helper 307. The name is preferably a 128-bit UUID associated with a specific service as specified in the Bluetooth specification rather than a text name. Thus, for example, the application 313 may request a connection by specifying the address of the peer device and the UUID of the desired service, at which time BTHTDI 305 performs an SDP query to map the name to the appropriate PSM value. The PSM value, used to establish the connection, may be inconsistent from server to server, however the UUID is preferably consistent.

Alternatively, the application may be designed to perform its own SDP query, for example to discover additional details about the server to which it is attempting to connect. In this case, WSHBTH 307 rather than BTHTDI 305 preferably performs the SDP query for the application.

During connection setup, as will be discussed in greater detail hereinafter, a connection request from the application traverses the Winsock DLL 301, and the AFD user and kernel mode components 311 and 309, to arrive at the Transport driver BTHTDI.SYS 305. At this point, BTHTDI.SYS 305 preferably initiates and terminates a series of communications with the peer device to automatically establish a valid Bluetooth connection.

The establishment of a Bluetooth connection to a remote device associated with a remote service illustrates the operation of both the translation layer BTHTDI 305 and the Winsock helper module 307. When Winsock 301 is commanded by the application to establish a remote connection, it issues a request to that effect. When BTHTDI 305 receives this request via TDI from the higher layers, it translates the request into an appropriate format such as BRB_Request and passes it to the L2CAP layer BTHPORT 303 for transmission. Upon receiving an L2CA_ConnectCfm (Direct Callback) communication from the peer remote device via BTHPORT 303, BTHTDI 305 issues a BRB_L2CAP_CONFIG_REQ (IRP) for purposes of setting packet size and other communications details. If the configuration information is acceptable to the peer, a L2CA_ConfigCfm (Direct Callback) communication will be sent by the peer and received by BTHTDI 305 via BTHPORT 303. Before, during, or after this exchange, the peer device will send and receive similar communications to establish proper configuration of its connection.

During this process, WSHBTH 307 preferably aids in establishing the connection by providing Winsock 301 with necessary connection information such as the Bluetooth address of the device, a service class ID, and a port value. WSHBTH 307 preferably also provides socket address to Bluetooth string address translation. In addition, as indicated above, WSHBTH 307 preferably also maintains a name-to-SDP mapping, simplifying or eliminating SDP queries. Each item of information available from WSHBTH may be provided by WSHBTH to Winsock pursuant to a request from Winsock expressly or impliedly seeking such information.

Once the connection is established, Winsock 301 uses BTHTDI 305 to facilitate Bluetooth communications. For example, Winsock 301 may send a data "write" request to BTHTDI 305. In turn, BTHTDI 305 translates the request to the appropriate format, for example BRB_L2CAP_ACL_TRANSFER (IRP), with flag set to false, and forwards it to BTHPORT 303. Likewise, when Winsock 301 sends a data "read" request, BTHTDI 305 translates the request to the appropriate format, for example BRB_L2CAP_ACL_TRANSFER (IRP), with flag set to true, and forwards it to BTHPORT 303. Note that both BTHTDI 305 and BTHPORT 303 may use the well-known IRP (IO Request Packet) kernel mode interface for exchanging information.

As will now be apparent, to access the Bluetooth functionality provided by this embodiment of the invention, the user application should be either Winsock-compliant as provided, or interfaced to Winsock via an appropriate translation layer as those skilled in the art will understand. Such translation layers are easily constructed and require few lines of computer code. This embodiment thus allows developers who are familiar with Winsock but not L2CAP to nonetheless easily provide Bluetooth enabled applications, without being subject to the limitations imposed by RFCOMM. The Bluetooth-specific details of the connection and communications are automatically addressed by BTHTDI and WSHBTH.

Figure 4:
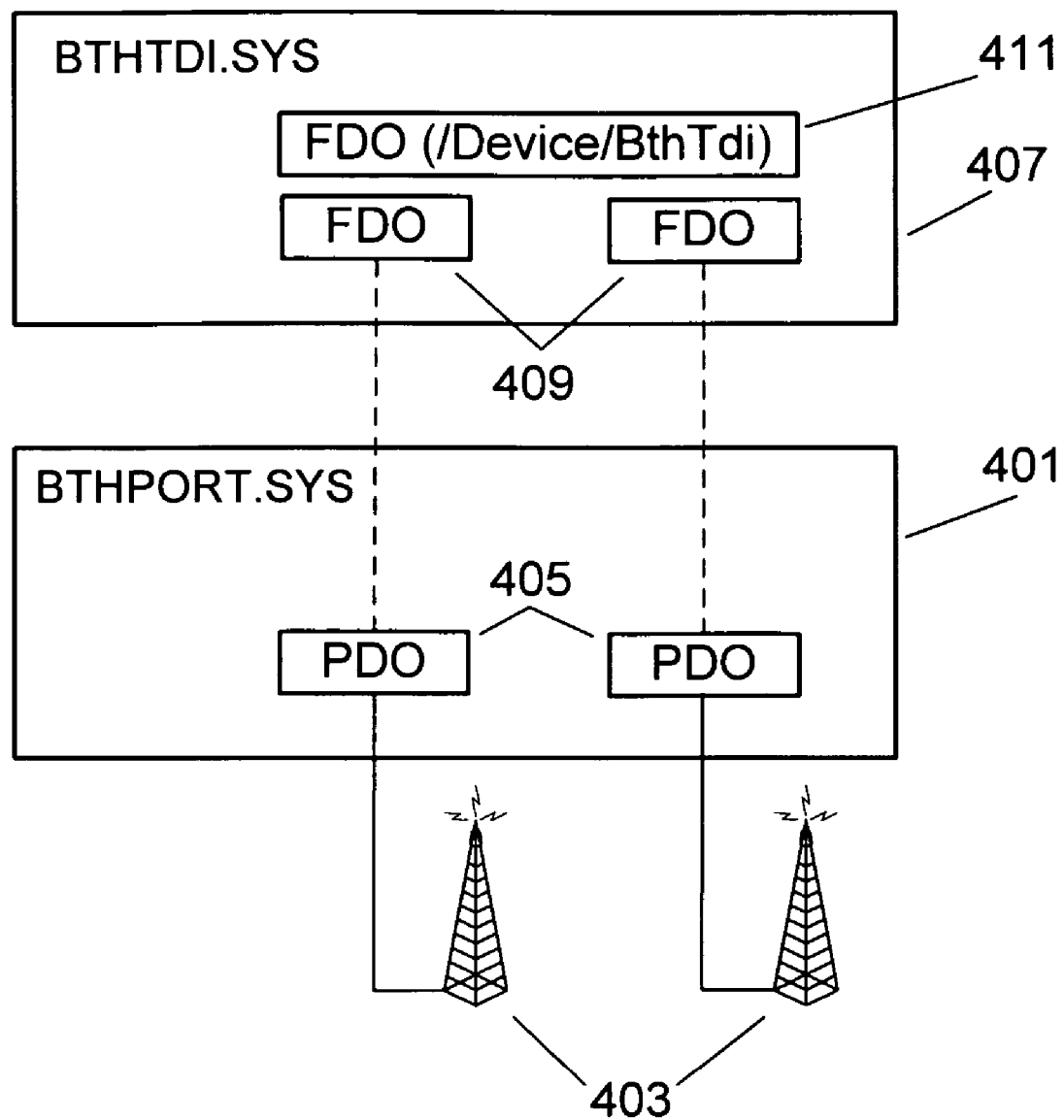
FIG. 4 is a detailed diagram of connection creation with respect to the lower layers of the layered architecture illustrated in FIGS. 2 and 3.

Having discussed the structure and function of an embodiment of the invention, the detailed operation of the various system components will now be discussed in greater detail. As illustrated in FIG. 4, BTHPORT.SYS 401 acts as the bus enumerator for the local Bluetooth radio 403, ejecting a Physical Device Object (PDO) 405 for every local Bluetooth device 403. The BTHTDI driver 407 creates a functional device object (FDO) 409 and associates it with the received PDO. In addition to the collection of local-device-mapped FDO's 409 created in this manner, it will also create a central FDO 411 with a known device name such as "\Device\BthTdi." BTHTDI 407 preferably uses this central FDO 411 to hide the existence of multiple radios 403 from the drivers that interface to BTHTDI 407.

Thus, for example, the Winsock helper WSHBTH, not shown, can query "\Device\BthTdi." In turn, BTHTDI 407 preferably initiates multiple queries using each device's FDO 409 and builds a combined response to be sent back to the Winsock helper. Any connection requests that must specify a preferred local Bluetooth device preferably specify the BdAddr of the device. BTHTDI 407 subsequently sends the connection request to the FDO 409 associated with the specified device.

With regard to the Service Discovery Protocol (SDP), the details and requirements of this protocol are described in the Bluetooth specification, incorporated by reference above. In summary, the Bluetooth SDP provides a mechanism for applications associated with Bluetooth devices to advertise services to applications associated with other remote devices. There is generally one SDP server for each Bluetooth device; the SDP server maintains Service Records accessible by other devices and the applications associated therewith. Each Service Record contains all of the information of a service within a server, and consists of a list of Service Attributes such as ServiceClassIDList (identifying the type of service represented by a service record), ServiceID (uniquely identifying a specific instance of a service), ProtocolDescriptorList (specifying the protocol stack or stacks that may utilize a service), and ServiceName (a text string containing a human-readable name corresponding to the service). A Service Attribute is specified by the tuple consisting of a 16-bit integer (Attribute ID, Attribute Value) identifying the particular attribute and an associated Attribute Value. With respect to SDP querying, the Winsock/SDP interface WSHBTH.DLL optionally queries by calling directly to the base group's SDP driver, rather than by using BTHTDI. Such functionality may be exposed via an appropriate Name Service Provider (NSP) API. Alternatively, WSHBTH.DLL may not provide an NSP function at all, or such a function may be provided via separate .DLL files.

With regard to BTHTDI, this component is layered over an L2CAP channel, providing reliable transport. Each session may be identified by the Bluetooth device address (BT_ADDR) and the Protocols/Service Multiplexer (PSM) number of the two endpoints. Furthermore, regardless of which device initiates a session, both devices preferably can support both client and server applications.

To enable this aspect of operation, BTHTDI preferably supports Server Channels. Each application should register a Server PSM number, with the PSM value selected according to the guidelines set forth in the Bluetooth specification, with the exception that BTHTDI may allow the use of any valid PSM number regardless of reserved ranges. This allows developers to provide custom implementations of services that may be already otherwise available in the protocol stack. For example, if RFCOMM were to use a dynamic PSM, a user of the Microsoft brand "WINDOWS" operating system could provide their own implementation of RFCOMM to be layered atop BTHTDI, even if RFCOMM is already available in the "WINDOWS" protocol stack.

Any service layered over BTHTDI should create a Service Record as described above. The Service Record should additionally contain a Server PSM number that remote devices are to use when using the service. The Server PSM number may for example be listed as a protocol-specific attribute.

Relating this information to the earlier description of this embodiment, Winsock applications that want to "listen," or wait, for a connection should advertise a BTHTDI session number in the Service Discovery Database. Likewise, Winsock applications that wish to connect to a remote device should read the remote device's Service Discovery Database to determine which BTHTDI Server PSM number to use. Preferably, as described, the Service PSM is hidden from the application itself, with the application simply specifying and accepting strings in this context, and the lower layers such as WSHBTH.DLL performing querying/setting of the Service Discovery Databases.

Extra definitions related to Bluetooth on Winsock may be defined in a header file such as Ws2Bth.H. Such a file may be used to create programs that use Bluetooth via Winsock. This file may define the Winsock address family for Bluetooth (AF_BTH), the format of a Winsock address for Bluetooth (SOCKADDR_BTH), etc.

Some exemplary interface definitions are given below in the context of Winsock 2.0, and, where appropriate, in the context of Winsock 1.1. For connection and data transfer, an interface such as WSAStartup( ) is called to initiate Winsock and to determine the level of Winsock support in the operating system. As an alternative to trying to initially determine the level of Winsock support, an application may simply request support at a certain level, terminating or retrying with a different level, and optionally informing the user, if the requested support is unavailable. Subsequently a new socket for inbound or outbound connections is created, by a call to a socket( ) interface. The appropriate protocol value for Bluetooth sockets is preferably specified in this call. An example of a call to a sockets( ) interface is as follows:

```
SOCKET s;
If ((s = socket(AF_BTH, SOCK_STREAM, BTHPROTO_L2CAP))
    = = INVALID_SOCKET)
    WSAGetLastError ( );
The composition of an exemplary socket address structure
SOCKADDR_BTH is as follows:
#define AF_BTH 32 // The address family used for Bluetooth
#define BTH_PORT_WILDCARD   -1
#define BTH_PORT_NULL       0
typedef struct_bd_addr {
    union {
      struct{
        unsigned int LAP  :  24;//Lower address part
        unsigned int UAP  :  8; //Upper address part
      };
      unsigned int SAP;     //Significant address part
    };
    unsigned short NAP;     //Nonsignificant address part
} BD_ADDR, *PBD_ADDR;
typedef struct_SOCKADDR_BTH
{
    USHORT      addressFamily;
    BD_ADDR     bdAddr;
    GUID        serviceClassID;
    ULONG       port;
} SOCKADDR_BTH, *PSOCKADDR_BTH;
```

A bind( ) call is preferably used to link the created socket to the specified port. Server applications preferably call the "bind" interface with a SOCKADDR_BTH structure where the port=BTH_PORT_WILDCARD, so that the channel may be automatically specified by BTHTDI. Once a bound socket is created, it may be advertised via a complete Bluetooth SDP record, established by a call to an appropriate interface such as WSASetServivce( ). The Winsock server can call getsockname( ) to determine the port number assigned to their socket by BTHTDI pursuant to the bind( ) call.

In order to "listen" for a connection, a Winsock server preferably calls a listen( ) interface to set BTHTDI to accept connections on a particular port. Preferably, the relevant service is already advertised in its local SDP database. With respect to accepting a connection request, an accept( ) call for BTHTDI preferably behaves in the same manner as for any standard sockets implementation.

A connect request from an originating device preferably specifies the target device in a manner such that the target is identifiable. In this embodiment, there are two ways for a target device to be specified: according to one mechanism, the SOCKADDR_BTH can directly specify the port number to which a connect is requested. This mechanism requires that an SDP query be performed prior to attempting to connect. Alternatively, the SOCKADDR_BTH can specify the unique service class ID of the service with which it wishes to connect. In this case, if the peer device has a plurality of ports that correspond to the specified service class ID, the connect call preferably iteratively attempts to form a connection until one succeeds or until all ports have been tried. This mechanism does not require prior SDP queries.

Some connections may require an identification number such as a PIN prior to allowing connectivity. In such cases, the PIN may be specified via a call to connect with an ioctlsocket (SIO_SET_BTH_PIN). Since it is not always known in advance whether a PIN is needed, a failure to connect may be used to signal that a PIN is required. Thus, the resultant control flow may be similar to the following:

```
Result = connect (s, addr, addrlen);
if (Result = = SOCKET_ERROR) {
    if (WSAGetLastError ( ) = = WSAEACCES)  {
        QueryUserForPin (&pin);
        ioctlsocket(s, SIO_SET_BTH_PIN, &pin);
        Result = connect (s, addr, addrlen);
    }
}.
```

Mechanisms usable for reading and writing data in this embodiment of the invention include all standard read/write mechanisms currently supported by other address families.

A Bluetooth PIN structure should be passed in by the application for authentication on the connect call via a structure such as the following:

```
typedef struct BTH_PIN {
    int length;
    char PIN[16];
} BTH_PIN;
```

The TDI equivalent of this call is TDI_ACTIONBTH_SET_PIN, with the same structure.

If, as in this embodiment, SDP registration is separate from socket control, then care should be taken to clean up SDP database entries after abnormal abortion of an application. For SDP registration via the Winsock2 NSP API, a new namespace, NS_BTH is assigned. Servers register their specific service information with Winsock and the BTHTDI driver using the WSASetService( ) call. WSASetService( ) may be used according to the following prototype:

| INT | WSASetService( | | |
|---|---|---|---|
| | LPWAQUERYSET | lpqsRegInfo, | |
| | WSAESETSERVICEOP | essOperation | |
| | DWORD | dwControlFlags | |
| ); | | | |

The fields of the WSAQUERYSET structure associate to the values in the SDP record as follows:

| lpqsRegInfo | dwSize | Sizeof(WSAQUERYSET) |
|---|---|---|
| | lpzServiceInstance-Name | The displayable text name of the service |
| | dwNameSpace | NS_BTH |
| | dwNumberOfCsAddrs | 1 |
| | lpcsaBuffer | Pointer to a CSADDR_INFO structure describing the address of the new entry |
| | lpBlob | The entire SD service record as described in the Bluetooth specification. For BTHTDI protocol entries, the port number is the same as returned by the getsockname( ) call. A new entry should contain an empty (NULL) service record handle. The service record handle will be filled in before WSASetService returns. If a service record handle is specified for a record that is unknown by SDP, it will be ignored and a new record will be created, and a new service record handle created for that record. |
| | * | All other WSAQUERYSET fields are ignored |
| essOperation | | RNRSERVICE_REGISTER |
| dwControlFlags | | 0 (clear) |

For BTHTDI there is a one-to-one correspondence between SD records and server sockets, and hence BTHTDI need not use SERVICE_MULTIPLE.

In addition to its use in establishing SD records, WSASetService can also be used to update an existing SD record with new information. The parameters of the call in this case are essentially the same as in the initial record registration, with the exception that the SD service record passed in via lpBlob should contain the service record handle. If there are any differences in the records, the existing record will be changed to match the passed in record. The service record handle can be discovered by querying for the record after it is initially registered using the WSALookupService*( ) functions, to be described in greater detail below.

Similarly, WSASetService can also be used to delete an existing SD record. In this case, the fields of the WSAQUERYSET should be set as follows:

| lpqsRegInfo | dwSize | Sizeof(WSAQUERYSET) |
|---|---|---|
| | lpServiceClassID | The well known UUID of the specific BTHTDI service |
| | dwNameSpace | NS_BTH |
| | dwNumberOfCsAddrs | 1 |
| | lpcsaBuffer | Pointer to a CSADDR_INFO structure describing the address of the new entry |
| | * | All other WSAQUERYSET fields are ignored |
| essOperation | | RNRSERVICE_DELETE |
| dwControlFlags | | 0 (clear) |

The following reveals the prototypes for the WSALookupService*( ) functions:

| INT | WSALookupServiceBegin( | | |
|---|---|---|---|
| | LPWSAQUERYSET | lpqsRestrictions, | |
| | DWORD | dwcontrolFlags, | |
| | LPHANDLE | lphLookup | |
| ); | | | |
| INT | WSALookupServiceNext( | | |
| | HANDLE | hLookup, | |
| | DWORD | dwcontrolFlags, | |
| | LPWSAQUERYSET | lpqsResults | |
| ); | | | |
| INT | WSALookupServiceEnd( | | |
| | HANDLE | hLookup | |
| ); | | | |

Clients attempting to discover the existence of a particular service on the BTHTDI server use the WSALookupService*( ) functions. Queries may be of local or remote addresses, although for BTHTDI, only remote addresses can be connected to. There are three basic query types: query of services on local device; query of devices, visible and ghosted; and query of services on specified peer device.

To query for devices, the members of the WSAQUERYSET structure are used as follows:

| lpqsRestrictions | dwSize | sizeof(WSAQUERYSET) |
|---|---|---|
| | lpServiceClassId | The well known UUID of the specific BTHTDI service |
| | dwNameSpace | NS_BTH |
| | * | All other WSAQUERYSET fields are ignored |
| dwControlFlags | LUP_CONTAINER | Specified for query of device list |
| | LUP_RETURN_NAME | Returns the friendly name of the service |
| | LUP_RETURN_ADDR | Returns a SOCKADDR_BTH structure, containing the 48-bit address of the peer. The other members of SOCKADDR_BTH will be clear. |

-continued

| | | |
|---|---|---|
| | LUP_RETURN_BLOB | Returns the following structure:<br>typedef struct    BTH_DEVICE_INVO {<br>    BD_ADDR Address;<br>    CoD ClassOfDevice;<br>    UCHAR    Name [MAX_NAME_SIZE];<br>}<br>BTH_DEVICE_INFO,*PBTH_DEVICE_INFO; |

To query for services, the members of the WSAQUERYSET structure are used as follows:

| | | |
|---|---|---|
| IpqsRestrictions | dwNumber | Sizeof(WSQUERYSET) |
| | lpServiceClassId | The most specific Bluetooth UUID |
| | dwNameSpace | NS_BTH |
| | dwNumberOfCsAddrs | 1 |
| | IpcsaBuffer | These are not ignored for Bluetooth queries. The application may specify a target device upon which to enumerate services. |
| | IpBlob | If lpBlob is NULL, the UUID specified in lpServiceClassId is used for the search. If lpBlob is non-NULL, it points to an SDP service search request with more specific search parameters, formatted according to the Bluetooth specification. In this case, lpServiceClassId will be ignored. |
| | * | All other WSAQUERY fields are ignored. |
| dwControlFlags | LUP_CONTAINER | Not set. |
| | LUP_FLUSHCACHE | Specifies to ignore any cached information and rerun SDP on the specified device. If this flag is not set, the information returned will be based on the last SDP query done on the target |
| | LUP_RES_SERVICE | Specifies to search only the local SDP database |
| | LUP_RETURN_NAME | Returns the friendly name of the service |
| | LUP_RETURN_TYPE | Returns the service class ID |
| | LUP_RETURN_ADDR | Returns the address to be used with connect() calls. The returned address will contain both the port number and the service class ID for BTHTDI sessions |
| | LUP_RETURN_COMMENT | Returns the text comment (if available) |
| | LUP_RETURN_BLOB | Returns the matching SD record, formatted according to the Bluetooth specification |
| | LUP_RETURN_ALL | Returns all of the above |

Note that "IpServiceClassId" determines the scope of the query. If set to the UUID of the L2CAP protocol, it would return all the L2CAP services on the target, essentially enumerating all SD records on the target. If set to the UUID of a specific service, it would only return the instances of that service.

The WSALookupServiceNext( ) call enumerates the services that match the query as specified in WSALookupServiceBegin( ), one per call. The WSALookupServiceEnd( ) call terminates the query and cleans up the context. If a WSALookupServiceNext( ) call is pending on the specified handle in another thread, it will be as if that call were cancelled.

The WSALookupService*( ) functions describe a polled interface, which is impractical for applications which wish to wait and automatically connect to new peers as they come into range, or to provide special user notification upon seeing a new peer. Therefore, non-polled mechanisms should also be provided.

WSANSPIoctl( ) may be used to supplement Winsock2, to allow for notification of namespace changes. Exemplary steps to implement this function are to:

1. Call WSALookupServiceBegin( );
2. Call WSANSPIoctl( ) with dwControlCode set to SIO_NSPNOTIFYCHANGE. This call will block until either a new Bluetooth device comes into view or an existing Bluetooth device goes out of range;
3. Proceed to call WSALookupServiceNext( ) to re-enumerate visible devices;
4. Call WSALookupSeviceEnd( ); and
5. Repeat Alternately, an application could call WSANSPIoctl( ) repeatedly on one thread, and notify another thread to do a new Begin/Next/End sequence, to avoid missing changes that occur between calls to WSANSPIoctl( ). The query specified preferably does not affect the operation of WSANSPIoctl( ). Any change in the namespace should cause WSANSPIoctl( ) to complete, regardless if the change affects the query results.

For contexts where WSANSPIoctl( ) is unavailable, BTHTDI should support this ioctl to give notification of changes in the Bluetooth namespace. Steps to use this are:
1. Call GetProcAddress( ) to discover that WSANSPIoctl is unavailable;
2. Call socket( ) to create a BTHTDI socket;
3. Call WSAIoctl(SIO_NSPNOTIFYCHANGE); and 4. Call WSALookupService* to enumerate the namespace.

The Winsock helper WSHBTH.DLL implements a number of functions that may be used by Winsock 1.1 and/or Winsock 2.0. The following chart lists these functions, and indicates which version of Winsock requires such a function. Note that any Winsock function that is not fully implemented, such as WSHJoinLeaf and WSHGetBroadcastSockaddr in this example, are preferably implemented as simple functions that return an error when called.

| FUNCTION | Required for Winsock 1.1 | Required for Winsock 2.0 |
|---|---|---|
| WSHEnumProtocols | YES | YES |
| WSHGetSockAddrType | YES | YES |
| WSHGetSockInformation | YES | YES |
| WSHGetWildCardSockAddr | YES | YES |
| WSHGetWinsockMapping | YES | YES |
| WSHNotify | YES | YES |
| WSHOpenSocket | YES | YES |
| WSHSetSocketInformation | YES | YES |
| WSHAddressToString | NO | YES |
| WSHGetProviderGuid | NO | YES |
| WSHGetWSAProtocolInfo | NO | YES |
| WSHIoctl | NO | YES |
| WSHOpenSocket2 | NO | YES |
| WSHStringToAddress | NO | YES |

The prototype for the WSHEnumProtocols function is shown below:

```
INT
    WSHEnumProtocols(
        IN LPINT      1piProtocols, OPTIONAL
        IN LPWSTR   1pTransportKeyName,
        IN OUT LPVOID 1pProtocolBuffer,
        IN OUT KPDWORD 1pdwBufferLength
        );
```

This function returns a list of protocols (Windows Sockets PROTOCOLS_INFO structures) that the WSH DLL supports. The following attributes are reported for each protocol:

PROTO_INFO FIELDS for BTHPROTO_L2CAP

| BTHPROTO_L2CAP | |
|---|---|
| dwServiceFlags | XP_GUARANTEED_ORDER \| XP_GUARANTEED_DELIVERY |
| iAddressFamily | AF_BTH |
| iMaxSockAddr | sizeof(SOCKADDR_BTH) |
| iMINSockAddr | sizeof(SOCKADDR_BTH) |
| iSocketType | SOCK_STREAM |
| IProtocol | BTHPROTO_L2CAP |
| DwMessageSize | 0 |
| LPProtocol | "BthTdi" |

The prototype for the WSHGetSockAddrType function is shown below:

```
INT
    WSHGetSockaddrType(
        IN PSOCKADDR Sockaddr,
        IN DWORD SockaddrLength,
        Out PSOCKADDR_INFO SockaddrInfo
        );
```

This function verifies the "Sockaddr" and "SockaddrLength" and provides information on the address type. The "AddressInfo" and "EndpointInfo" fields of the "SockaddrInfo" are set as follows:

| | |
|---|---|
| BdAdd = = BD_ADDR_NULL | Address Info = SockaddrAddressInfoWildcard; EndpointInfo = SockaddrEndPointInfoWildcard; |
| BdAddr is a reserved address | Address Info = SockaddrAddressInfoWildcard; EndpointInfo = SockaddrEndPointInfoReserved; |
| Otherwise | Address Info = SockaddrAddressInfoNormal; EndpointInfo = SockaddrEndPointInfoNormal; |

The reserved addresses that are checked for are the Inquiry Access Code (IAC) range.

The prototype for the WSHGetSocketInformation function is shown below:

```
INT
    WSHGetSocketInformation(
        IN PVOID HelperDllSocketContext,
        IN SOCKET SocketHandle,
        IN HANDLE TdiAddressObjectHandle,
        IN HANDLE TdiConnectionObjectHandle,
        IN INT Level,
        IN INT OptionName,
        OUT PCHAR OptionValue,
        OUT INT OptionLength
        );
```

This function is called whenever getsockopt is passed an option that Windows Sockets does not explicitly support.

The prototype for the WSHGetWildCardSockAddr function is shown below:

```
INT
    WSHGetWildcardSockaddr(
        IN PVOID HelperDllSocketContext,
        OUT PSOCKADDR Sockaddr,
        OUT PINT SockaddrLength
        );
```

This function is called when Windows Sockets needs to perform an "automatic" bind of a socket. BTHTDI may return all zero fields for both bdAddr and port.

The prototype for the WSHGetWinsockMapping function is shown below:

```
DWORD
    WSHGetWinsockMapping(
        OUT PWINSOCK_MAPPING Mapping,
        IN DWORD MappingLength
        );
```

This function returns information about the address family, socket type, and protocol parameter triples supported by the WSHBTH.DLL. The supported triples are:

| AF_BTH | SOCK_STREAM | BTHPROTO_L2CAP |
|--------|-------------|----------------|
| AF_BTH | SOCK_STREAM | 0 |
| AF_BTH | 0 | BTHPROTO_L2CAP |

The prototype for the WSHNotify function is shown below:

```
INT
    WSHNotify(
        IN PVOID HelperDllSocketContext,
        IN SOCKET SocketHandle,
        IN HANDLE TdiAddressObjectHandle,
        IN HANDLE TdiConnectionObjectHandle,
        IN WORD NotifyEvent
        );
```

This function is called to notify the Winsock Helper DLL of a state transition.

The prototype for the WSHOpenSocket function is shown below:

```
INT
    WSHOpenSocket(
        IN OUT PINT AddressFamily,
        IN OUT PINT SocketType,
        IN OUT PINT Prototype,
        OUT PUNICODE_STRING TransitionDeviceName,
        OUT PVOID HelperDllSocketContext,
        OUT PDWORD NotificationEvents
        );
```

This function is called when a socket is opened.

The prototype for the WSHSetSocketInformation function is shown below:

```
INT
    WSHSetSocketInformation(
        IN PVOID HelperDllSocketContext,
        IN SOCKET SocketHandle,
        IN HANDLE TdiAddressObjectHandle,
        IN HANDLE TdiConnectionObjectHandle,
        IN INT Level,
        IN INT OptionName,
        IN PCHAR OptionValue,
        IN INT OptionLength
        );
```

This function is called whenever setsockopt is passed an option that Windows Sockets does not explicitly support. BTHTDI driver preferably supports {Level=SOL_SDP, OptionName=SDP_ENUMDEVICES), an option that is used to initiate an inquiry, and that returns the list of the discovered devices as an OptionValue.

The prototype for the WSHAddressToString function is shown below:

```
INT
    WSHAddressToString(
        IN LPSOCKADDR Address,
        IN INT AddressLength,
        IN LPWSAPROTOCOL_INFOW ProtocolInfo, OPTIONAL
        OUT LPWSTR AddressStringLength
        );
```

This function returns a logical string representation of a socket address that can be used for display purposes. The string format for the BTHTDI address is as specified for Bluetooth addresses in the Bluetooth specification.

The prototype for the WSHGetProviderGuid function is shown below:

```
INT
    WSHGetProviderGuid(
        IN LPWSTR ProviderName,
        OUT LP LPGUID ProviderGuid
        );
```

This function returns the GUID that identifies the protocols supported by a helper DLL. For example, the BTHTDI Winsock helper may use "42a6920f-e18b-4cd9-ac3c-ed490446eecb" as its GUID value.

The prototype for the WSHGetWSAProtocolInfo function is shown below:

```
INT
    WSHGetWSAProtocolInfo(
        IN LPWSTR ProviderName,
        OUT LPWSAPROTOCOL_INFOW *ProtocolInfo,
        OUT LPDWORD ProtocolInfoEntries
        );
```

This function returns a pointer to protocol information for the protcol(s) supported by a helper DLL. This function should be used, if at all, during setup. The following shows an exemplary LPWSAPROTOCOL_INFOW structure that is returned.

```
WSAPROTOCOL_INFOW WINSOCK2Protocols[ ] =
{
    {
    XP1_GUARANTEED_DELIVERY           // dwServiceFlags1
        | XP1_GUARANTEED_ORDER
        | XP1_IFS_HANDLES,
    0,                                // dwServiceFlags2
    0,                                // dwServiceFlags3
    0,                                // dwServiceFlags4
    PFL_MATCHES_PROTOCOL_ZERO,        // dwProviderFlags
    {                                 // gProviderId
        0, 0, 0,
        { 0, 0, 0, 0, 0, 0, 0, 0 }
    },
    0,                                // dwCatalogEntryId
    {                                 // ProtocolChain
        BASE_PROTOCOL,                // ChainLen
        { 0, 0, 0, 0, 0, 0, 0 }       // ChainEntries
    },
    WINSOCK_SPI_VERSION,              // iVersion
    AF_BTH,                           // iAddressFamily
    sizeof(SOCKADDR_BTH),             // iMaxSockAddr
```

```
8,                            // iMinSockAddr
SOCK_STREAM,                  // iSocketType
BTHPROTO_L2CAP,               // iProtocol
0,                            // iProtocolMaxOffset
BIGENDIAN,                    // iNetworkByteOrder
SECURITY_PROTOCOL_NONE,       // iSecurityScheme
0,                            // dwMessageSize
0,                            // dwProviderReserved
L "MSAFD L2CAP [Bluetooth]"   // szProtocol
    }
};
```

The prototype for the WSHIoctl function is shown below:

```
INT
    WSHIoctl
        IN PVOID HelperD11SocketContext,
        IN SOCKET SocketHandle,
        IN HANDLE TdiAddressObjectHandle,
        IN HANDLE TdiConectionObjectHandle,
        IN DWORD IoControlCode,
        IN LPVOID InputBuffer,
        IN DWORD Input BufferLength,
        IN LPVOID OutputBuffer,
        IN DWORD OutputBufferLength,
        OUT LPDWORD NumberOfBytesReturned,
        IN LPWSAOVERLAPPED Overlapped
        IN LPWSAOVERLAPPED_COMPLETION_ROUTINE
        CompletionRoutine,
        OUT LPBOOL NeedsCompletion
        );
```

This Winsock Helper Input Output Control provides a mechanism for passing special requests to query or set data from a Winsock provider. Such requests may be generic or may be specific to Bluetooth. For example, WSHIoctl may be used to query for or to set the maximum packet size used by Bluetooth.

The prototype for the WSHOpenSocket2 function is shown below:

```
INT
    WSHOpenSocket2(
        IN OUT PINT AddressFamily,
        IN OUT PINT SocketType,
        IN OUT PINT Protocol,
        IN GROUP Group,
        IN DWORD Flags,
        OUT PUNICODE STRING TransportDeviceName,
        OUT PVOID *HelperD11SocketContext
        OUT PDWORD NotificationEvents
        );
```

This function performs the protocol-specific actions for creating a new socket. If this function is exported, it replaces the WSHOpenSocket function.

The prototype for the WSHStringToAddress function is shown below:

```
INT
    WSHStringToAddress(
        IN LPWSTR AddressString,
        IN DWORD AddressFamily,
        IN LPSWAPROTOCOL_INFOW ProtocolInfo, OPTIONAL
        OUT LPSOCKADDR Address,
        IN OUT LPDWORD AddressStringLength
        );
```

This function converts a logical string representation of a socket address to a SOCKADDR structure. The string representation is as described above with respect to the WSHAddressToString( ) helper function.

With respect to the BTHTDI driver, this driver exposes a kernel mode TDI interface to BTHPORT for use by AFD.SYS. In this embodiment, BTHTDI uses the NT IO model wherein IO request packets (IRPs) are issued to the transport driver by upper protocol layers (TDI clients). BTHTDI extends the NT IO model by defining IRPs to include addressing information, IOCTLs for connection setup and data exchange, and a callback mechanism for asynchronous notification from BTHTDI to the TDI client.

Each transport protocol defines an address that describes endpoint information associated with address objects that are open in the transport. The TDI address of a BTHTDI endpoint is defined as a simple 8-byte value, six bytes of which correspond to the Bluetooth address, and the top two bytes of which may remain unused. The address may be specified as follows:

typedef ULONGLONG bt_addr, *pbt_addr, BT_ADDR, *PBT_ADDR.

The BTHTDI driver provides the standard DriverEntry( ) function for driver initialization. During initialization, it sets the function pointers for DriverUnload and MajorFunctions. The major functions (IRP_MJ_*) that are preferably supported are: IRP_MJ_CREATE; IRP_MJ_CLEANUP; IRP_MJ_CLOSE; IRP_MJ_PNP; and IRP_MJ_DEVICE_CONTROL. It is not required that all minor functions be processed. For example, with respect to IRP_MJ_PNP, PNP, minor functions may be propagated down the stack rather than processed.

With respect to IRP_MJ_DEVICE_CONTROL, once BTHTDI is called for this function, it calls TdiMapUserRequest( ) to determine whether the control code maps to an IOCTL_TDI_* function. If so, the stack location is remapped to an IRP_MJ_INTERNAL_DEVICE_CONTROL, with the control code changed from IOCTL_TDI_* to TDI_* function codes. Failure of the TdiMapUserRequest( ) preferably indicates that the control code is a BTHTDI specific code. Preferably, the following control codes are supported: case TDI_ASSOCIATE_ADDRESS; case TDI_DISASSOCIATE_ADDRESS; case TDI_DISCONNECT; case TDI_CONNECT; case TDI_SEND; and case TDI_RECEIVE.

Figure 5:
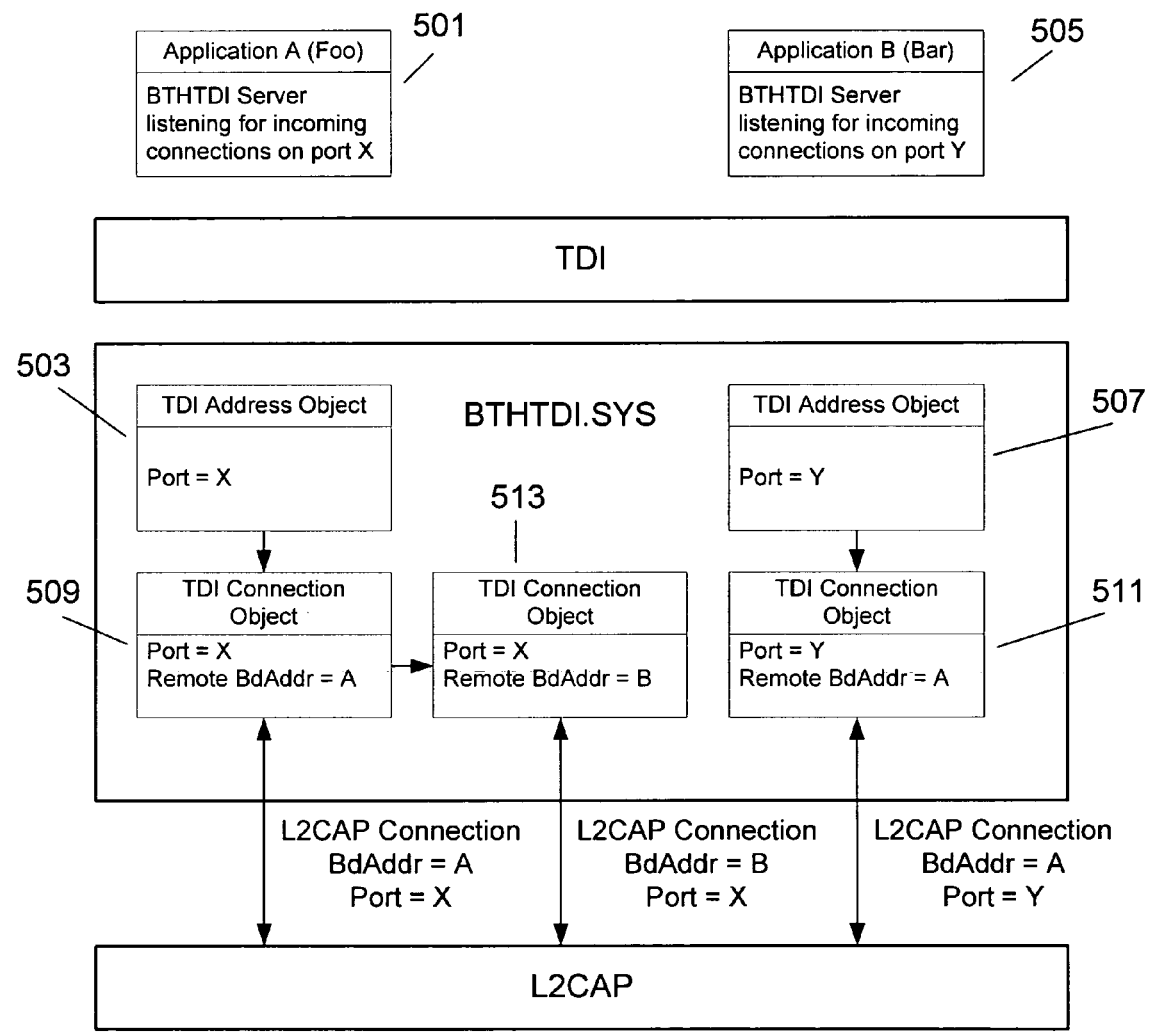
FIG. 5 is a schematic illustration of BT-HTDI session multiplexing within an embodiment of the invention.

A session multiplexing scenario is illustrated in FIG. 5. Application A 501, which supports a service "foo," creates an address object 503 on a specific port X. Application A 501 optionally registers the service/port mapping with SDP. Application B 505, which supports a service "bar," creates an address object 507 on port Y, and also optionally registers the service/port mapping with SDP. Subsequently, a device with bdAddr=A sends a connection request to port X, leading to the creation of a connection object 509 associated with the port X address object 503. The device with bdAddr=A also sends a connection request to port Y for service "bar," leading to the creation of a connection object 511 associated with the port Y address object 507. Finally, a device with bdaddr=B sends a connection request to port X, initiating the creation of a connection object 513 associated with the port X address object 503. These various connection scenarios are exemplary, and one of skill in the art will appreciate that other session multiplexing scenarios are possible in view of the teachings herein.

Figure 6:
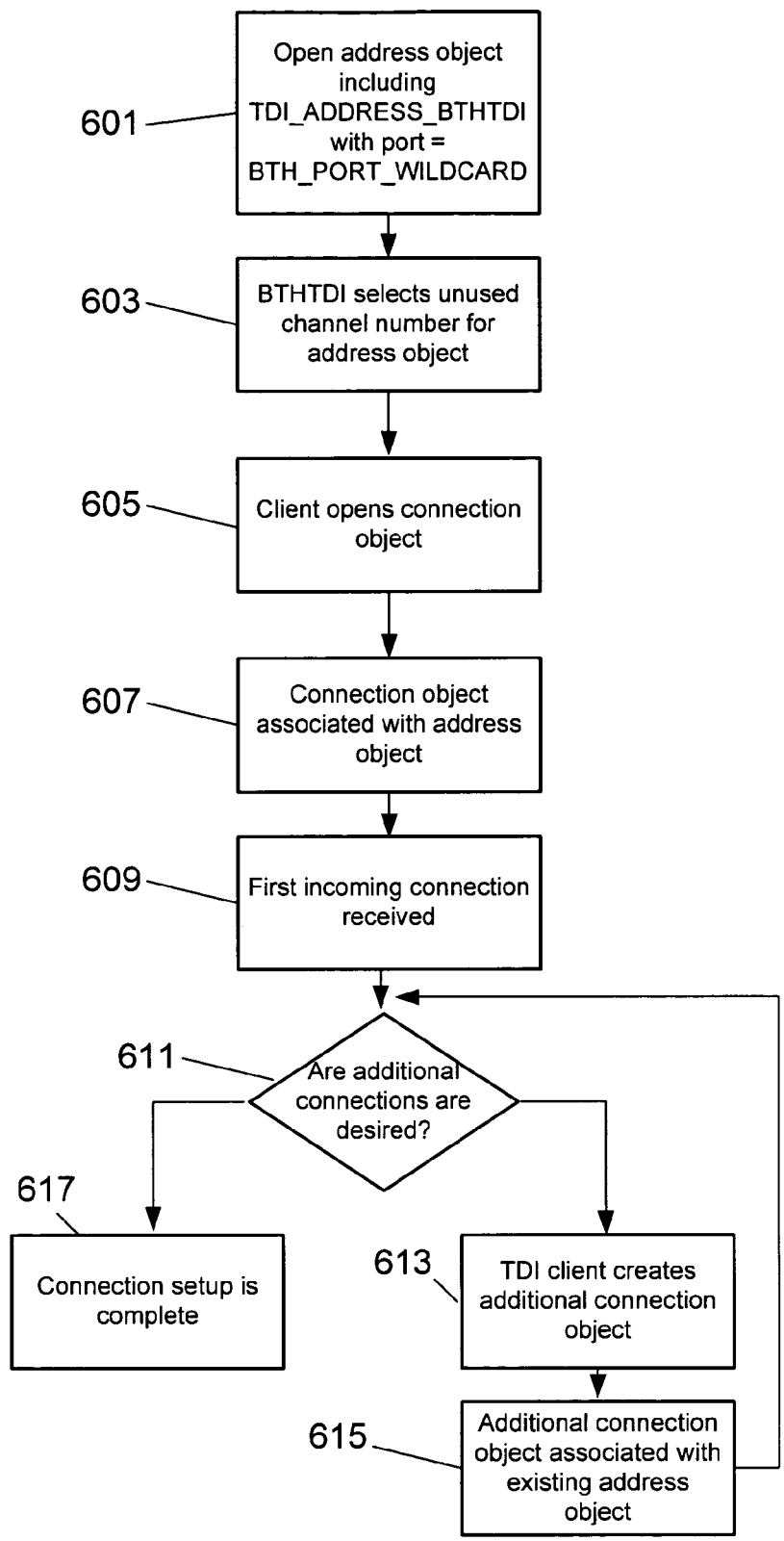
FIG. 6 is a flow chart illustrating steps taken within an embodiment of the invention to effectuate creation of one or more server endpoints.

With reference to the flow chart of FIG. 6, a TDI client will open server endpoints for accepting incoming connections by first opening an address object in Step 601 including a TDI_ADDRESS_BTH with port=BTH_PORT_WILDCARD, so that in Step 603 BTH-TDI will select an unused channel number for the object. Alternatively, the client may specify a valid PSM number, and if the specified port is in use, then the opening of the address object preferably fails. Next, the client opens a connection object in Step 605 to be associated in Step 607 with the address object just created. This will be the connection object for the first incoming connection, received in Step 609. After accepting an incoming connection, if additional connections are desired at decision 611, the TDI client should create another connection object in Step 613 for the next incoming connection and associate it in Step 615 with the existing address object. If this connection is subsequently assigned, and the client wishes to accept still further connections, the client may create another connection object. When connection setup is complete in step 617, BTHTDI should return the remote bdAddr and port, such as via TDI_ADDRESS_BTH.

Figure 7:
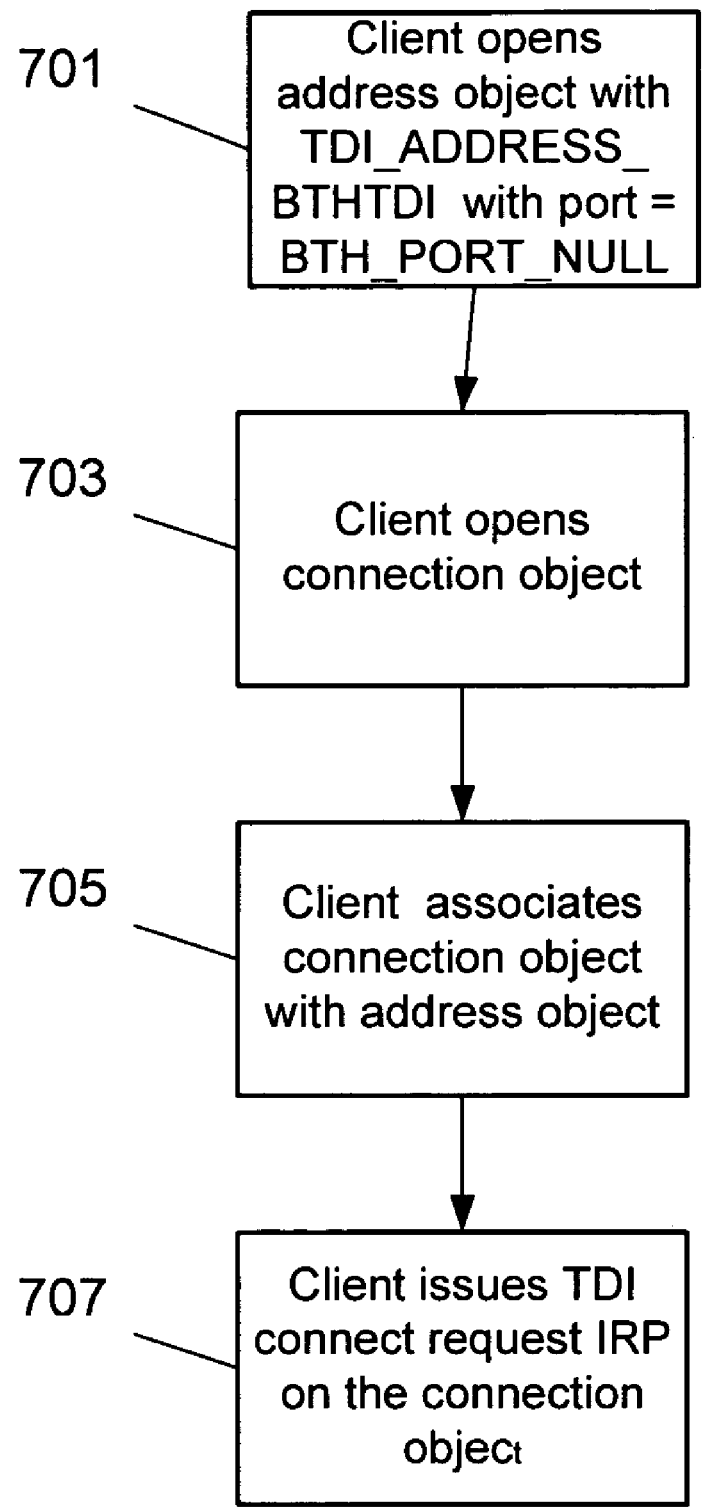
FIG. 7 is a flow chart illustrating steps taken within an embodiment of the invention to effectuate creation of a client connection to a remote device.

With reference to the flow chart of FIG. 7, a TDI client opens client connections to remote devices by first opening an address object in step 701, including a TDI_ADDRESS_BTH with port=BTH_PORT_NULL. The NULL port indicates that the address object will be used for an outbound connection and the stack should not reserve a server channel number for it. The bdAddr value may be ignored and should be set to zero. Subsequently in step 703, the client opens a connection object and associates it in step 705 with the address object. Finally in step 707, the client preferably issues a TDI connect request IRP on the connection object, the IRP containing a TDI_ADDRESS_BTH with the bdAddr and port of the remote device.

As discussed above, the BTHTDI driver interfaces to the BTHPORT component through Bluetooth Request Block (BRB) messages. A more detailed discussion of BRB messaging is given in "Windows Whistler IRPs for Bluetooth," included at Appendix A, and herein incorporated by reference in its entirety. The messages exchanged between the drivers preferably follow the OSI semantics for communication between layers. For each initiated connection, the BTHTDI driver registers an interface with the BTHPORT. An exemplary set of interface configuration information is as follows:

| FIELD | VALUE |
| --- | --- |
| PSM | PSM value of this connection |
| Context | PFdo |
| Size | Sizeof (Interface) |
| Version | BTHPORT_VERSION_FOR_QI |
| HCI_UnknownEvent | NULL |
| L2CA_ConnectInd | BrpbConnectInd |
| L2CA_ConnectCfm | NULL |
| L2CA_ConfigInd | BrpbConfigInd |
| L2CA_ConfigCfm | NULL |
| L2CA_DisconnectInd | BrpbDisconnectInd |
| L2CA_DisconnectCfm | NULL |
| L2CA_QoSViolation | NULL |

TDI_CONNECT and TDI_DISCONNECT functions preferably result in a request being sent to the BTHPORT driver, which then sends the connect/disconnect indication received on a PSM number to the callback routines of the interface associated with that PSM number. BTHTDI may also configure the connection for quality of service (QoS) by sending a request to BTHPORT and receiving an indication callback to the function specified in the interface corresponding to that connection.

TDI_SEND and TDI_RECEIVE functions preferably result in requests being sent to the BTHPORT driver without the need for a callback routine. The BTHTDI driver preferably implements a full duplex data exchange such that at the application level, either peer is free to send data at any time over a valid connection. Thus, the BTHTDI driver does not necessarily support TDI_SEND_DATAGRAM and TDI_RECEIVE_DATAGRAM.

It will be appreciated in view of the foregoing that a novel and useful architecture has been invented and disclosed herein for exposing the L2CAP layer of Bluetooth to user mode so that user mode applications can easily exploit Bluetooth functionality without being constrained by the limitations imposed by RFCOMM. This invention confers a benefit primarily on application developers and others, who, in view of the teachings herein, may enjoy and exploit generic access to the L2CAP layer without prior knowledge of the intricacies of the Bluetooth protocols.

In view of the many possible embodiments to which the principles of this invention may be applied, it should be recognized that the embodiment described herein with respect to the drawing figures is meant to be illustrative only and should not be taken as limiting the scope of invention. For example, although the invention has been described in the context of Winsock and the Microsoft brand "WINDOWS" operating system, those of skill in the art will recognize that other systems and general architectures may be used. For example, in the UNIX environment, equivalent generic access to BTHPORT could be supplied by providing an interface between applications and BTHPORT.

Note also that the elements of the illustrated embodiment shown in software may be implemented in hardware and vice versa and that the illustrated embodiment can be modified in arrangement and detail without departing from the spirit of the invention. Therefore, the invention as described herein contemplates all such embodiments as may come within the scope of the following claims and equivalents thereof.

All of the references cited herein are hereby incorporated in their entireties by reference.

We claim:

1. A computer-readable storage medium on which is stored a Winsock module comprising:
   a Winsock application interface;
   a Bluetooth driver coupling providing access to a Bluetooth protocol and a plurality of Bluetooth protocol functions;
   a translation layer operable to translate Winsock requests received at the Winsock application interface into a format configured for the plurality of Bluetooth protocol functions and to forward the translated Winsock requests to one or more of the plurality of Bluetooth protocol functions via the Bluetooth driver coupling, wherein the Bluetooth protocol and the plurality of Bluetooth protocol functions are accessed through the translation layer via the Winsock application interface using the Winsock requests; and
   a function configured for accepting data from the Winsock application interface and for interfacing with the Bluetooth driver coupling to access one or more of the plurality of Bluetooth protocol functions based on the data.

2. The computer-readable storage medium of claim 1, wherein the function comprises:
a name which is: socket;
a parameter for accepting a value from the data, the parameter representing protocol information associated with the Bluetooth protocol;
executable instructions for accessing at least one of the plurality of Bluetooth protocol functions and creating a new socket associated with the Bluetooth protocol; and
executable instructions for returning information about the new socket including a socket handle.

3. The computer-readable storage medium of claim 1, wherein the function comprises:
a name which is: bind;
a parameter for accepting a value from the data, the parameter representing socket information including a port and a socket, the socket and socket information being associated with the Bluetooth protocol;
executable instructions for accessing at least one of the plurality of Bluetooth protocol functions and performing a bind operation including linking the socket to the port; and
executable instructions for returning information about the bind operation.

4. The computer-readable storage medium of claim 1, wherein the function comprises:
a name which is: getsockname;
a parameter for accepting a value from the data, the parameter representing a socket associated with the Bluetooth protocol;
executable instructions for accessing at least one of the plurality of Bluetooth protocol functions and identifying a port associated with the socket; and
executable instructions for returning information about the port.

5. The computer-readable storage medium of claim 1, wherein the function comprises:
a name which is: listen;
a parameter for accepting a value from the data, the parameter representing a socket bound to a port, the socket associated with the Bluetooth protocol;
executable instructions for accessing at least one of the plurality of Bluetooth protocol functions and performing a listen operation including accepting a connection request on the socket bound to the port; and
executable instructions for returning information about the listen operation.

6. The computer-readable storage medium of claim 1, wherein the function comprises:
a name which is: accept;
a parameter for accepting a value from the data, the parameter representing a socket associated with the Bluetooth protocol;
executable instructions for accessing at least one of the plurality of Bluetooth protocol functions and performing an accept operation including accepting a connection request on the socket; and
executable instructions for returning information about the accept operation including a socket handle.

7. The computer-readable storage medium of claim 1, wherein the function comprises:
a name which is: connect;
a parameter for accepting a value from the data, the parameter representing socket information including a socket, the socket and socket information being associated with the Bluetooth protocol;
executable instructions for accessing at least one of the plurality of Bluetooth protocol functions and performing a connect operation including establishing a connection to the socket; and
executable instructions for returning information about the connect operation including a result.

8. The computer-readable storage medium of claim 1, wherein the function comprises:
a name which is: WSASetService;
a parameter for accepting a value from the data, the parameter representing service information associated with the Bluetooth protocol;
executable instructions for accessing at least one of the plurality of Bluetooth protocol functions and performing a registration operation including registering and updating and deleting the service information with the Winsock module; and
executable instructions for returning information about the registration operation.

9. The computer-readable storage medium of claim 8, wherein the function comprises:
a name which is: WSALookupServiceBegin;
a parameter for accepting a value from the data, the parameter representing query information associated with the Bluetooth protocol;
executable instructions for accessing at least one of the plurality of Bluetooth protocol functions and performing a query initialize operation using the query information; and
executable instructions for returning information about the query initialize operation including a handle.

10. The computer-readable storage medium of claim 9, wherein the function comprises:
a name which is: WSALookupServiceNext;
a parameter for accepting a value from the handle, the parameter representing a query operation associated with the query initialize operation and the Bluetooth protocol;
executable instructions for accessing at least one of the plurality of Bluetooth protocol functions and performing an enumeration operation including enumerating service information represented by the query information; and
executable instructions for returning information about the enumeration operation including a query result.

11. The computer-readable storage medium of claim 9, wherein the function comprises:
a name which is: WSALookupServiceEnd;
a parameter for accepting a value from the handle, the parameter representing a query operation associated with the query initialize operation and the Bluetooth protocol;
executable instructions for accessing at least one of the plurality of Bluetooth protocol functions and performing an free operation including freeing the handle; and
executable instructions for returning information about the free operation.

12. The computer-readable storage medium of claim 1, wherein the function comprises:
a name which is: WSANSPIoctl;
a parameter for accepting a value from the data, the parameter representing information associated with the Bluetooth protocol;
executable instructions for accessing at least one of the plurality of Bluetooth protocol functions and performing an notification operation including notification of a namespace change; and executable instructions for returning information about the notification operation.

13. A system for providing Bluetooth communications functionality comprising:
- a Winsock module operating on a computing device;
- a Winsock application interface of the Winsock module;
- a Bluetooth driver coupling providing access to a Bluetooth protocol and a plurality of Bluetooth protocol functions;
- a translation layer operable to translate Winsock requests received at the Winsock application interface into a format configured for the plurality of Bluetooth protocol functions and to forward the translated Winsock requests to one or more of the plurality of Bluetooth protocol functions via the Bluetooth driver coupling, wherein the Bluetooth protocol and the plurality of Bluetooth protocol functions are accessed through the translation layer via the Winsock application interface using the Winsock requests; and
- a function configured for accepting data from the Winsock application interface and for interfacing with the Bluetooth driver coupling to access one or more of the plurality of Bluetooth protocol functions based on the data.

14. The system of claim 13, wherein the Winsock module is a dynamic link library named ws2_32.dll.

15. The system of claim 13, wherein the Winsock module operates in a user mode of the computing device.

16. The system of claim 13, wherein the Winsock module couples via the Bluetooth driver coupling with a Bluetooth driver operating in a kernel mode of the computing device.

17. The system of claim 13, wherein the Winsock application interface is a programming interface.

18. The system of claim 13, further comprising a coupling to a Bluetooth Logical Link Control and Adaptation Layer Protocol.

19. The system of claim 13, further comprising a coupling to a Bluetooth helper module.

20. The system of claim 19, wherein the coupling is a programming interface.

* * * * *